US012748425B2

(12) United States Patent
Mehrez Said et al.

(10) Patent No.: US 12,748,425 B2
(45) Date of Patent: Sep. 29, 2026

(54) GENERATION OF NAVIGATIONAL PATHS USING RECURSIVE PARTITIONING OF UNOCCUPIED SPACE

(71) Applicant: Skild-Fetch LLC, Pittsburgh, PA (US)

(72) Inventors: Mohamed W. Mehrez Said, Waterloo (CA); Ardalan Tajbakhsh, Wayland, MA (US)

(73) Assignee: Skild-Fetch LLC, Pittsburgh, PA (US)

( * ) Notice: Subject to any disclaimer, the term of this patent is extended or adjusted under 35 U.S.C. 154(b) by 343 days.

(21) Appl. No.: 17/873,852

(22) Filed: Jul. 26, 2022

(65) Prior Publication Data

US 2024/0036578 A1 Feb. 1, 2024

(51) Int. Cl.
*G05D 1/00* (2024.01)

(52) U.S. Cl.
CPC ......... *G05D 1/0214* (2013.01); *G05D 1/0238* (2013.01); *G05D 1/0274* (2013.01)

(58) Field of Classification Search
CPC ... G05D 1/0214; G05D 1/0238; G05D 1/0274
See application file for complete search history.

(56) References Cited

U.S. PATENT DOCUMENTS

2011/0166737 A1* 7/2011 Tanaka ................. G05D 1/0217 701/25
2016/0271795 A1 9/2016 Vicenti
2020/0156256 A1* 5/2020 Park ....................... B25J 11/008
2021/0156693 A1* 5/2021 Aldeborgh ............. G06N 20/00
2022/0171453 A1 6/2022 Powderly et al.
2023/0280164 A1* 9/2023 Kikkawa .............. G05D 1/0214 701/26

FOREIGN PATENT DOCUMENTS

JP 4251545 B2 * 4/2009 ........... G05D 1/0217

OTHER PUBLICATIONS

L. Han, F. Gao, B. Zhou and S. Shen, "FIESTA: Fast Incremental Euclidean Distance Fields for Online Motion Planning of Aerial Robots," 2019 IEEE/RSJ International Conference on Intelligent Robots and Systems (IROS), Macau, China, 2019 (Year: 2019).*

(Continued)

*Primary Examiner* — Jason Holloway
*Assistant Examiner* — Bryant Tang
(74) *Attorney, Agent, or Firm* — Fenwick & West LLP

(57) ABSTRACT

A method includes: obtaining a facility map containing at least one obstacle and unoccupied space; partitioning the unoccupied space into a set of initial cells, each initial cell having an initial boundary containing a portion of the unoccupied space according to a proximity between the portion of the unoccupied space and the at least one obstacle; generating an intermediate map containing the at least one obstacle, a set of virtual obstacles on the initial boundaries, and remaining unoccupied space; partitioning the remaining unoccupied space into a set of updated cells, each updated cell having an updated boundary containing a portion of the remaining unoccupied space according to proximity between the portion of the remaining unoccupied space, the at least one obstacle, and the virtual obstacles; and providing the set of updated cells to a navigational controller for generation of a navigational path for a mobile apparatus.

15 Claims, 7 Drawing Sheets

(56) References Cited

OTHER PUBLICATIONS

E. Marder-Eppstein, D. V. Lu, D. Hershberger "costmap_2d", 2018 ROS.org Documentation and Package Summary. https://wiki.ros.org/costmap_2d (Year: 2018).*
International Search Report and Written Opinion for International Application No. PCT/US2023/28065 mailed on Oct. 16, 2023.

* cited by examiner

GENERATION OF NAVIGATIONAL PATHS USING RECURSIVE PARTITIONING OF UNOCCUPIED SPACE

BACKGROUND

An autonomous apparatus, such as a robotic transporter, may be deployed in a facility to transport items between various locations in the facility. To navigate between such locations, the transporter may employ a map of the facility, indicating the locations of structures such as shelves, walls, and the like. Using the map, the transporter may generate a path between locations, through the unoccupied space around such structures. Path generation may be computationally intensive, and the computational cost of path generation can increase substantially with facility size.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
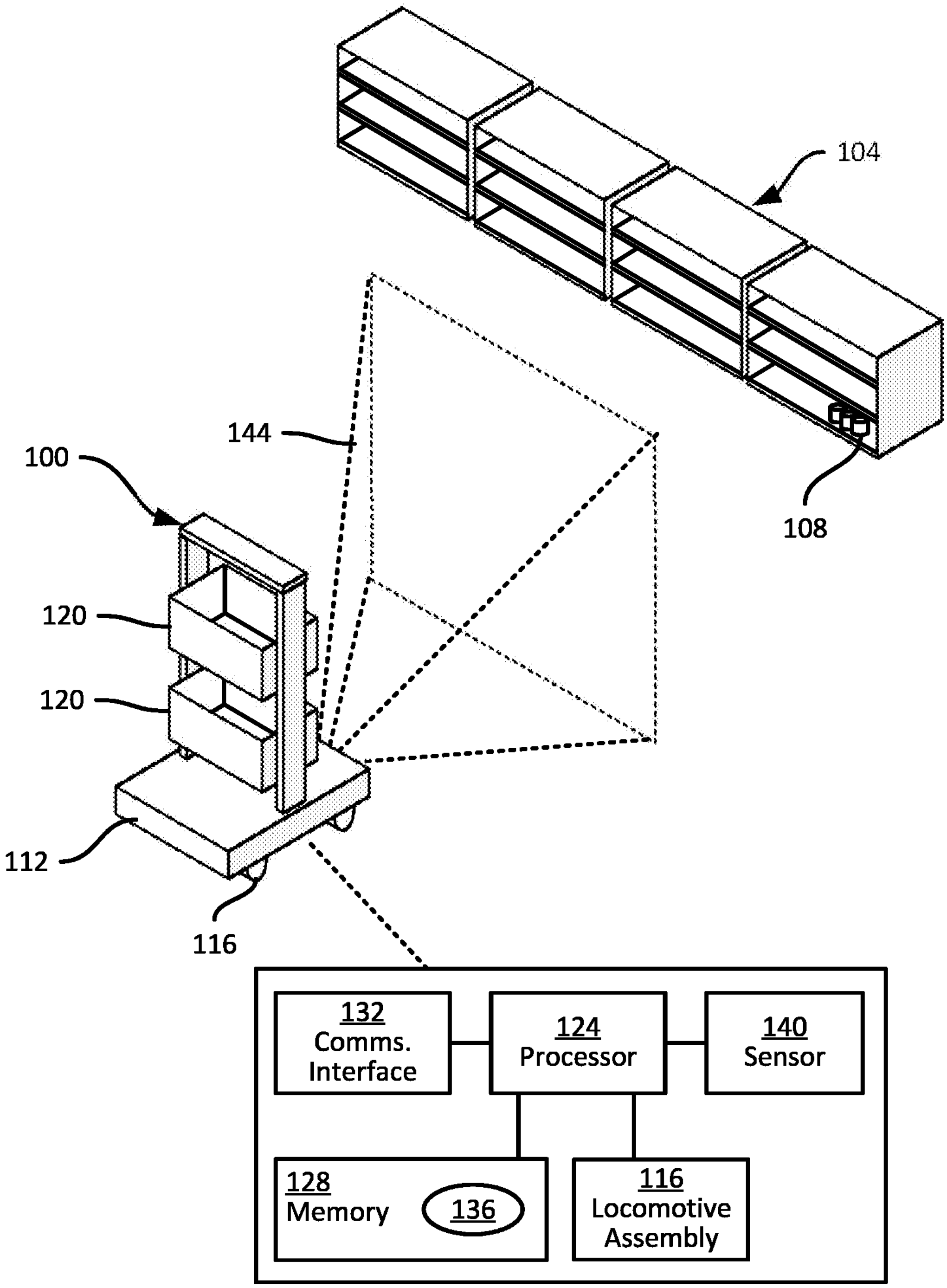
FIG. 1 is a diagram of a mobile apparatus deployed in a facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a method including: obtaining a map of a facility, the map containing at least one obstacle and unoccupied space; partitioning the unoccupied space into a set of initial cells, each initial cell having an initial boundary containing a portion of the unoccupied space according to proximity between the portion of the unoccupied space and the at least one obstacle; generating an intermediate map containing (i) the at least one obstacle, (ii) a set of virtual obstacles on the initial boundaries, and (iii) remaining unoccupied space; partitioning the remaining unoccupied space into a set of updated cells, each updated cell having an updated boundary containing a portion of the remaining unoccupied space according to proximity between the portion of the remaining unoccupied space, the at least one obstacle, and the virtual obstacles; and providing the set of updated cells to a navigational controller for generation of a navigational path for a mobile apparatus, the navigational path formed by segments of the updated boundaries.

Additional examples disclosed herein are directed to a computing device, comprising: a memory; and a processor communicatively coupled with the memory, the processor configured to: obtain a map of a facility, the map containing at least one obstacle and unoccupied space; partition the unoccupied space into a set of initial cells, each initial cell having an initial boundary containing a portion of the unoccupied space according to proximity between the portion of the unoccupied space and the at least one obstacle; generate an intermediate map containing (i) the at least one obstacle, (ii) a set of virtual obstacles on the initial boundaries, and (iii) remaining unoccupied space; partition the remaining unoccupied space into a set of updated cells, each updated cell having an updated boundary containing a portion of the remaining unoccupied space according to proximity between the portion of the remaining unoccupied space, the at least one obstacle, and the virtual obstacles; and provide the set of updated cells to a navigational controller for generation of a navigational path for a mobile apparatus, the navigational path formed by segments of the updated boundaries.

Further examples disclosed herein are directed to a non-transitory computer-readable medium storing computer-readable instructions executable by a processor to: obtain a map of a facility, the map containing at least one obstacle and unoccupied space; partition the unoccupied space into a set of initial cells, each initial cell having an initial boundary containing a portion of the unoccupied space according to proximity between the portion of the unoccupied space and the at least one obstacle; generate an intermediate map containing (i) the at least one obstacle, (ii) a set of virtual obstacles on the initial boundaries, and (iii) remaining unoccupied space; partition the remaining unoccupied space into a set of updated cells, each updated cell having an updated boundary containing a portion of the remaining unoccupied space according to proximity between the portion of the remaining unoccupied space, the at least one obstacle, and the virtual obstacles; and provide the set of updated cells to a navigational controller for generation of a navigational path for a mobile apparatus, the navigational path formed by segments of the updated boundaries.

FIG. 1 illustrates an autonomous or semi-autonomous mobile apparatus 100, also referred to herein simply as the apparatus 100. The apparatus 100 can be deployed in any of a wide variety of environments, such as an item-handling facility (e.g., a warehouse, retail facility, or the like). The facility can, for example, include a plurality of support structures, such as shelf modules 104, supporting items 108. Examples of the items 108 include, but are not limited to, grocery items, apparel, parcels, and the like.

The apparatus 100 includes certain components, and implements certain functionality, that enables the apparatus 100 to at least partially autonomously navigate the facility in which the apparatus 100 is deployed. For example, the apparatus 100 can be configured to navigate among aisles formed by the shelf modules 104, to collect images or other data corresponding to the items 108. In other examples, the apparatus 100 can be configured to navigate the facility to collect and/or deliver items 108 to various locations in the facility, e.g., in support of order fulfillment operations, re-stocking, and the like.

The apparatus 100 includes a chassis 112 supporting various other components of the apparatus 100. In the illustrated example, the chassis 112 supports a locomotive assembly 116, such as one or more electric motors or the like driving a set of wheels, tracks, or the like. The chassis 112 supports, in the illustrated example, one or more receptacles 120, such as bins, e.g., for receiving and transporting items 108 placed therein by workers or item-handling equipment in the facility. In other examples, depending on the nature of deployment of the apparatus 100, the receptacles 120 can be omitted. For example, when the apparatus 100 is deployed to capture image and/or other sensor data depicting the shelf modules 104 and items 108, the receptacles 120 can be omitted and the chassis 112 can support an array of data capture sensors such as lidar sensors, cameras, and the like.

The components supported by the chassis 112 also include a processor 124, e.g., in the form of one or more central processing units (CPU), graphics processing units (GPU), or dedicated hardware controllers such as application-specific integrated circuits (ASICs). The processor 124 is communicatively coupled with a non-transitory computer-readable medium, such as a memory 128. The memory 128 includes a combination of volatile memory (e.g., Random Access Memory or RAM) and non-volatile memory (e.g., read only memory or ROM, Electrically Erasable Programmable Read Only Memory or EEPROM, flash memory). The processor 124 and the memory 128 each comprise one or more integrated circuits. The processor 124 can also be communicatively coupled with a communications interface 132, such as a wireless transceiver enabling the apparatus 100 to communicate with other computing devices via suitable network infrastructure.

The memory 128 stores various data used for autonomous or semi-autonomous navigation by the apparatus 100, including a navigational application 136 executable by the processor 124 to implement navigational functions. In some examples, the above functions can be implemented via multiple distinct applications stored in the memory 128. In further examples, some or all such functions can be implemented by a distinct computing device, such as a server remote from the apparatus 100 and in communication with the apparatus 100 via a network deployed in the facility and/or accessible from within the facility. The results of such remotely-implemented navigational functions can be communicated to the apparatus 100 via the communications interface 132. The processor 124, as configured via execution of the application 136, can also be referred to as a navigational controller. As will be evident to those skilled in the art, the navigational controller can therefore also be implemented by a distinct computing device.

The chassis 112 also supports a navigational sensor 140, such as one or more cameras and/or depth sensors (e.g., lidars, depth cameras, or the like) communicatively coupled with the processor 124. The sensor 140, in the illustrated example, is configured to capture sensor data such as depth measurements depicting at least a portion of the physical environment of the apparatus 100. In particular, the sensor data represents an area encompassed by a field of view (FOV) 144 of the sensor 140. In some examples, the FOV 144 can be defined by individual FOVs of multiple sensors. For example, the apparatus 100 can include a depth camera with a substantially pyramidal FOV, such as that shown in FIG. 1, as well a lidar with a substantially planar FOV. As seen in FIG. 1, the sensor 140 is disposed on a base of the chassis 112. In other examples, the sensor 140 (or any subset of sensors, when more than one sensor is implemented) can be placed in other suitable locations on the chassis 112, including on the rack supporting the receptacles 120.

As will be discussed below in greater detail, the processor 124 is configured, via execution of the application 136, to process data representing the operating environment of the apparatus 100, e.g., including obstacles detected in data captured by the sensor 140 and obstacles represented in a predetermined map of the facility. The map can be stored in the memory 128, retrieved from a server via the communications interface 132, or the like. The map represents substantially static obstacles in the facility, such as the shelf modules 104, walls, doorways, and the like. The map can be updated periodically, e.g., when the layout of the facility is modified, although during the course of any given path generation operation, the map is generally static. Based on such processing, the processor 124 can be configured to generate navigational paths through the facility, e.g., to travel from a current location of the apparatus 100 to a target location.

To generate a path in the facility between two or more locations, the apparatus 100 is configured to generate path segments traversing unoccupied space in the facility. In some examples, the apparatus 100 can generate an occupancy grid that represents both obstacles in the map (e.g., the shelf modules 104), and any dynamic obstacles observed in the sensor data (which are generally not present in the map). The apparatus 100 can then be configured to select path segments from the set of unoccupied elements in the occupancy grid. The number of elements in the occupancy grid may be large (e.g., tens of thousands of elements), depending on the size of the facility. The selection of elements from such a grid to define a navigational path may therefore be computationally intensive, e.g., in terms of data storage load, processing load, or both. To reduce the computational load involved in path generation, the apparatus 100 can preprocess the map, as discussed below.

Figure 2:
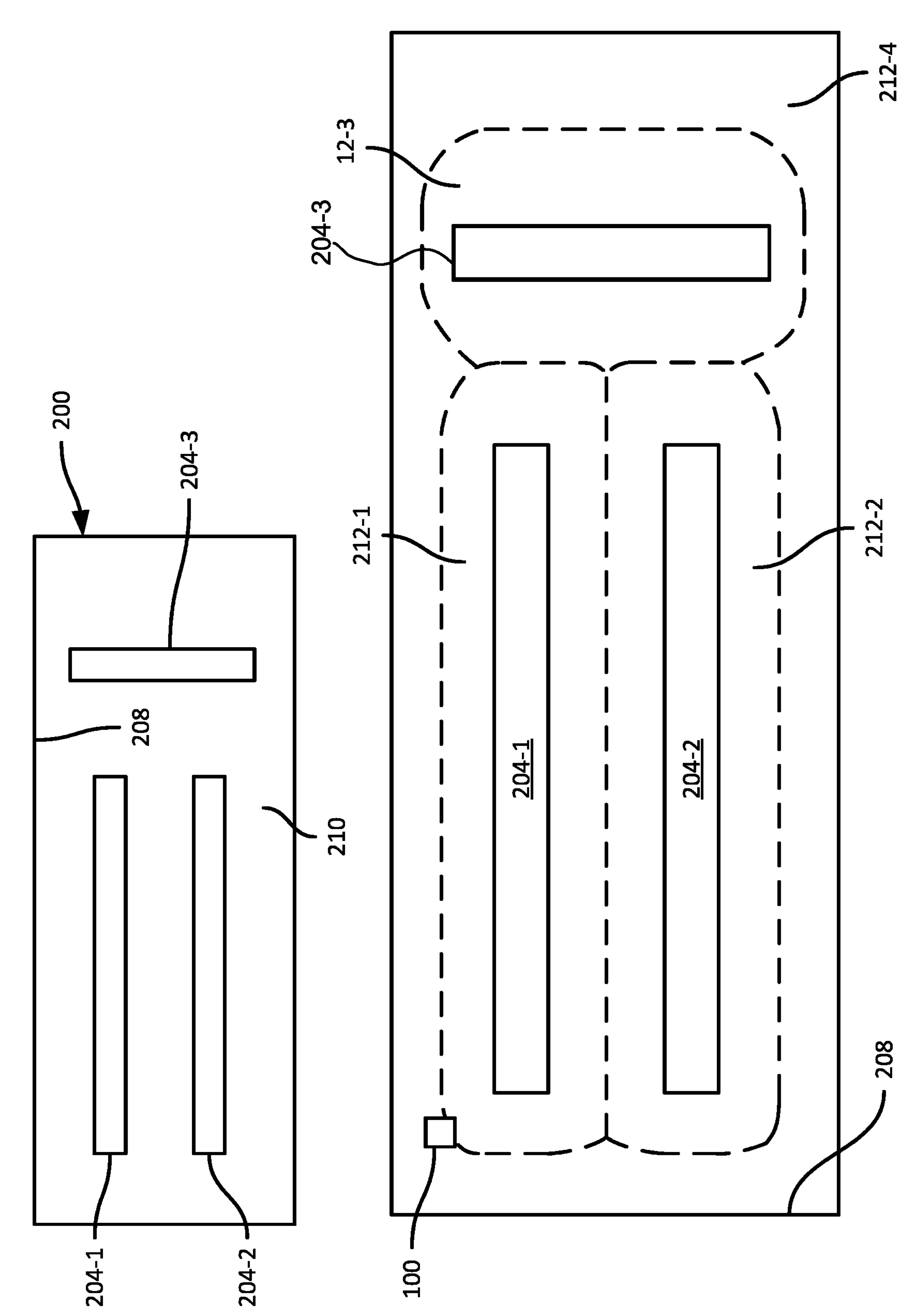
FIG. 2 is a diagram of a map of the facility and a set of initial cells generated from the map.

Referring to FIG. 2, an example map 200 of a facility is illustrated, in the form of a two-dimensional, top-down view of the facility indicating the locations of shelf modules 204-1, 204-2, and 204-3 (also referred to herein collectively as the shelf walls 204, and generically as a shelf wall 204; similar nomenclature is employed elsewhere herein), as well as surrounding walls 208. The map 200 contains, in addition to the shelf modules 204 and the walls 208, unoccupied space 210 that may also be referred to as free, or navigable, space. The unoccupied space 210 may be traversed by the apparatus 100. It will be evident that the map 200 is illustrative, and that a wide variety of other maps representing smaller or greater numbers of shelf modules 104 and/or other structures can also be employed, depending on the nature of the facility in which the apparatus 100 is deployed.

Prior to generating navigational paths, the apparatus 100 can be configured to partition the unoccupied space 210 into cells, with each cell having a boundary containing a portion of the unoccupied space 210 selected according to proximity of that portion with one of the obstacles in the map 200. For example, FIG. 2 illustrates a set of cells 212-1, 212-2, 212-3, and 212-4 each containing a portion of the unoccupied space 210. Collectively, the cells 212 encompass all the unoccupied space 210.

Each cell 212 can contain, for example, the portion of the unoccupied space 210 that is closer to a given obstacle than to any other obstacle. Thus, the cell 212-1 contains unoccupied space that is closer to the shelf module 204-1 than to other obstacles, the cell 212-2 contains unoccupied space that is closer to the shelf module 204-2 than to other obstacles, the cell 212-3 contains unoccupied space that is closer to the shelf module 204-3 than to other obstacles, and the cell 212-4 contains unoccupied space that is closer to the walls 208 than to other obstacles. Each cell 212 includes a boundary, shown in dashed lines in FIG. 2, and since the cells 212 together encompass all the unoccupied space 210, boundaries can be shared between adjacent cells 212.

It will now be evident to those skilled in the art that the cells 212 form a tessellation map, such as a Voronoi diagram, with the exception that the seeds or nodes for the diagram are polygons (the obstacles in the map 200) rather than single points. Various mechanisms can be employed for generating the cells 212, as will be evident to those skilled in the art. For example, the apparatus 100 can generate an approximated Voronoi diagram based on the map 200 by selecting a plurality of points in the unoccupied space 210. For each point, the apparatus 100 can then determine the closest obstacle in the map 200 to that point, and label the point with an identifier of the determined obstacle. The boundaries between cells 212 can then be generated by fitting lines, curves, or combinations thereof to the labelled points to encompass all, or substantially all, of the points labelled with the same obstacle within the same cell 212.

Having partitioned the unoccupied space 210, the apparatus 100 (illustrated for scale in FIG. 2) can then generate navigational paths by selecting segments of the cell boundaries. In other words, the search space for path generation is simplified to a set of line segments defined by the boundaries of the cells 212, rather than the entire area of the unoccupied space 210. In facilities with a plurality of apparatuses 100 deployed therein, the partitioning mechanism shown in FIG. 2 may lead to an increased use of exception handling routines or other navigational interruptions by the apparatuses 100, because of the sparse nature of the cell boundaries. For example, the cell boundaries illustrated in FIG. 2 provide a single path segment along the aisle between the shelf modules 204-1 and 204-2. Therefore, two distinct apparatuses 100 planning paths in that aisle may interfere with one another, despite the presence of sufficient unoccupied space in the aisle to accommodate both apparatuses 100, e.g., side by side.

As discussed below in greater detail, therefore, the apparatus 100 implements additional functionality via execution of the application 136 to recursively partition the occupied space 210 into successive sets of cells. Recursive partitioning enables the apparatus 100 to increase the available search space for path generation, while maintaining at least some of the computational advantage of such partitioning relative to path planning mechanisms based on occupancy grids. The advantage provided by an increased search space may be more pronounced in facilities in which more than one apparatus 100 are deployed. For example, collisions or interference between apparatuses 100 may be avoided or more readily resolved due to the greater variety of pathing options available to each apparatus 100. In addition, the cells resulting from recursive partitioning may better visually reflect the capacity of unoccupied space in the facility. For example, an aisle in the facility that is sufficiently wide to accommodate two or more apparatuses 100 simultaneously may be made readily observable via the partitioning mechanisms discussed below.

Figure 3:
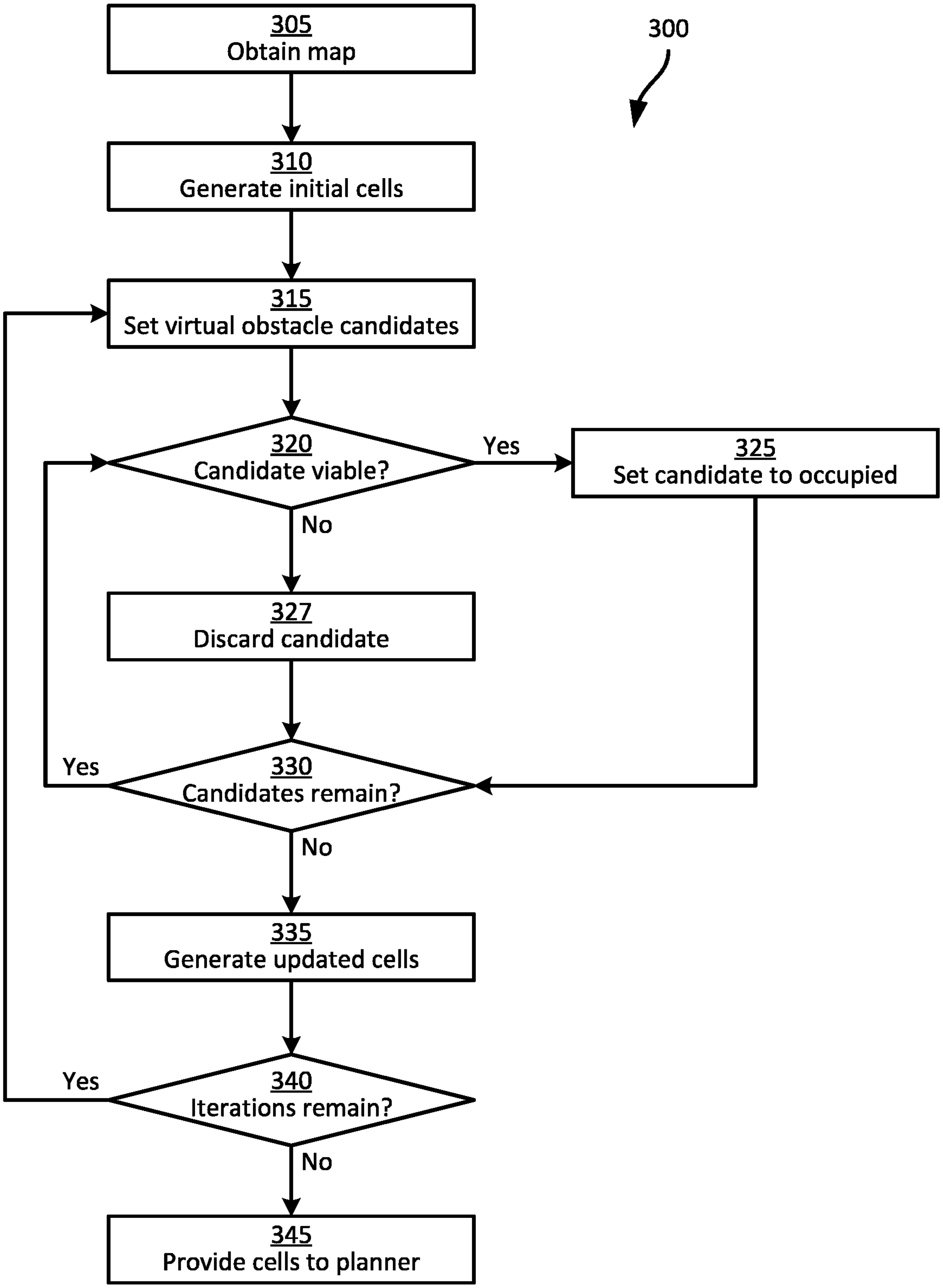
FIG. 3 is a flowchart of a method for recursive partitioning of unoccupied space for navigational path generation.

Turning to FIG. 3, a method 300 of recursive partitioning of unoccupied space for navigational path generation is illustrated. The method 300 will be described below in conjunction with its performance by the apparatus 100, e.g., via execution of the application 136 by the processor 124. In other examples, the method 300 can be performed by another computing device, and the output of the method 300 can be provided to the apparatus 100 for path generation and/or execution of a generated navigational path.

At block 305, the apparatus 100 is configured to obtain a map of the facility in which the apparatus 100 is deployed. The map obtained at block 305 can be the map 200 shown in FIG. 2, for example. The map 200 can be stored in the memory 128, or retrieved during the performance of the method 300 from another computing device. In some examples, the map obtained at block 305 can be generated substantially in real-time by the apparatus 100, e.g., by combining the facility map 200 with a dynamic obstacle map indicating the positions of obstacles observed via the sensor 140 and not represented in the map 200.

At block 310, the apparatus 100 is configured to generate a set of initial cells that partition the unoccupied space 210 into portions according to the proximity of those portions to the obstacles in the map 200. The generation of the set of initial cells can be performed as discussed above in connection with FIG. 2. That is, the apparatus 100 can generate an approximated Voronoi diagram by sampling a plurality of points in the unoccupied space 210, at a predetermined resolution, and labelling each sampled point with an identifier of the nearest obstacle, e.g., by Euclidean distance. The apparatus 100 can then fit cell boundaries to the labelled points.

At block 315, rather than deploying the set of initial cells for use in path planning, the apparatus 100 is configured to initiate the generation of a set of updated cells, using the boundaries of the set of initial cells to generate virtual obstacles for use in generating the set of updated cells. Specifically, at block 315 the apparatus 100 is configured to select a plurality of virtual obstacle candidates. The virtual obstacle candidates are then evaluated, as described below, to generate an intermediate map containing not only the obstacles in the map 200, but also a set of virtual obstacles.

Figure 4:
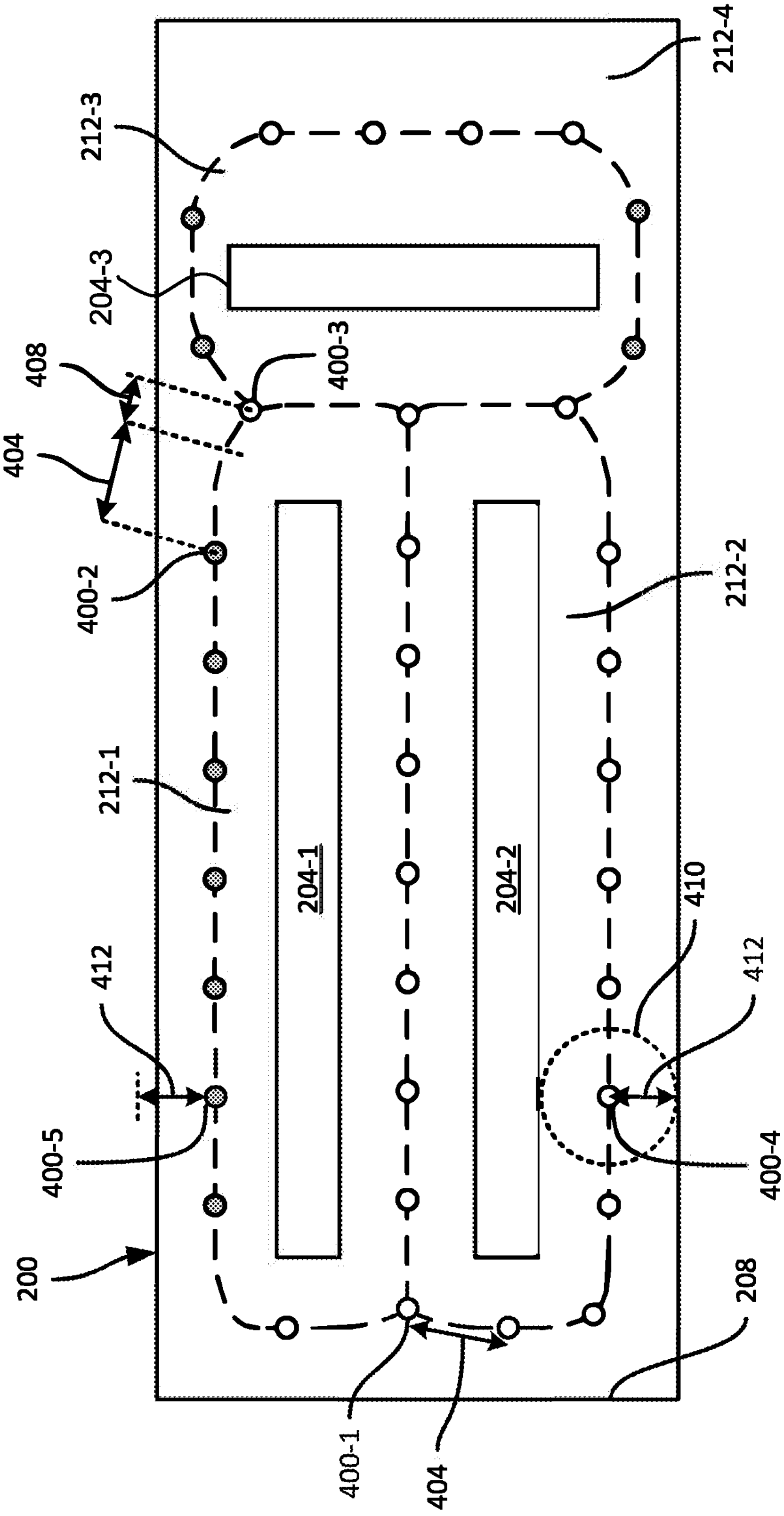
FIG. 4 is a diagram illustrating an example performance of blocks 315-325 of the method of FIG. 3.

Turning to FIG. 4, the map 200 is shown, along with the cells 212. A series of candidate virtual obstacles 400 (not all of which are labelled individually, for legibility of the diagram) are also shown. Each candidate virtual obstacle 400 can be, for example, a single point, e.g., a single pixel in an image forming the map 200. The candidate virtual obstacles 400 are illustrated as circles in FIG. 4 that exaggerate the size of such single points for illustrative purposes.

As seen in FIG. 4, the candidate virtual obstacles 400 are placed on the boundaries of the cells 212. To place the candidate virtual obstacles 400, the apparatus 100 can be configured to select an initial location of a candidate 400, and traverse the cell boundaries beginning at the initial candidate, placing further candidates 400 at predetermined distances apart. As illustrated, an initial candidate 400-1 is placed at a junction of more than two cell boundary segments (specifically, three boundary segments in the illustrated example). For instance, the apparatus 100 can be configured to place the initial candidate 400-1 at the junction having the largest number of cell boundary segments. When more than one junction has the same number of segments, the apparatus 100 can place the initial candidate 400-1 at the one of those junctions closest to an origin of the coordinate system of the map 200 (e.g., the bottom-left corner of the map 200). In other examples, the apparatus 100 can be configured to begin the placement of candidates 400 at another point on the cell boundaries than at a junction. For example, the apparatus 100 can place the initial candidate on the cell boundary closest to the origin of the map 200. In further examples, the apparatus 100 can place the initial candidate 400-1 at a randomly-selected location on the cell boundaries.

Having placed the initial candidate 400-1, the apparatus 100 is configured to place additional candidates 400, separated from the initial candidate 400-1 and each other by a predetermined separation distance 404. The predetermined distance 404 can be, for example, a multiple of the diameter of the apparatus 100 (e.g., three times the effective diameter of the chassis 112). Various other predetermined distances can also be used, including distances that are not based on the dimensions of the apparatus 100.

In some examples, the predetermined distance 404 may vary, e.g., according to additional placement criteria. For example, the apparatus 100 can determine whether another junction falls within a threshold marginal distance 408 of the predetermined distance 404 from a candidate 400. When there is a junction within the threshold marginal distance 408, as in the case of the candidates 400-2 and 400-3, the candidate 400-3 can be placed at the junction instead of at the predetermined distance 404 from the candidate 400-2.

Returning to FIG. 3, having placed the virtual obstacle candidates 400, the apparatus 100 can evaluate each candidate 400 and either keep or discard the candidates 400 based on such evaluation. Because the boundaries of updated cells generated using the virtual obstacles are later used for path generation, certain candidates 400 may be unsuitable for use in generating updated cells, as the boundaries of the updated cells may be close enough together to be impractical for simultaneous use by distinct apparatuses 100. In other examples, the evaluation discussed below can be omitted, and every candidate 400 can be retained for use as a virtual obstacle.

At block 320, the apparatus 100 is configured to select a candidate 400 (e.g., in the order the candidates 400 were placed) and determine whether the candidate 400 is viable for use as a virtual obstacle. Viability can be determined by, for example, determining whether an area around the candidate 400 having a predetermined radius is unoccupied. In the present example, the predetermined radius is based on the dimensions of the apparatus 100, e.g., twice the effective diameter of the chassis 112. Various other predetermined radii can also be employed, in other examples.

As seen in FIG. 4, the candidate 400-4 is surrounded by a region 410 of unoccupied space with a radius that is equal to or exceeds a predetermined radius 412, equal to twice the effective diameter of the apparatus 100. Therefore, the determination at block 320 for the candidate 400-4 is affirmative, and at block 325 the apparatus 100 is configured to set the point representing the candidate 400-4 to an occupied state. That is, the apparatus 100 is configured to generate a virtual obstacle at the position of the candidate 400-4.

In contrast, a distance between the candidate 400-5 and the wall 208 is less than the predetermined radius 412. Therefore, the determination at block 320 for the candidate 400-5 is negative, and the apparatus 100 instead proceeds to block 327, where the apparatus 100 discards the candidate 400-5, instead of retaining the candidate 400-5 as a virtual obstacle. FIG. 4 illustrates the candidates 400 discarded at block 327 following the evaluation at block 320 with a dark fill, and the candidates 400 retained at block 325 as virtual obstacles with a white fill.

After either block 325 or block 327, at block 330, the apparatus 100 determines whether any candidates 400 remain to be evaluated via block 320. When the determination at block 330 is affirmative, the apparatus 100 repeats block 320 for the next candidate 400. When the determination at block 330 is negative, indicating that all candidates 400 have been evaluated and either set as virtual obstacles or discarded, the apparatus 100 is configured to proceed to block 335.

Figure 5:
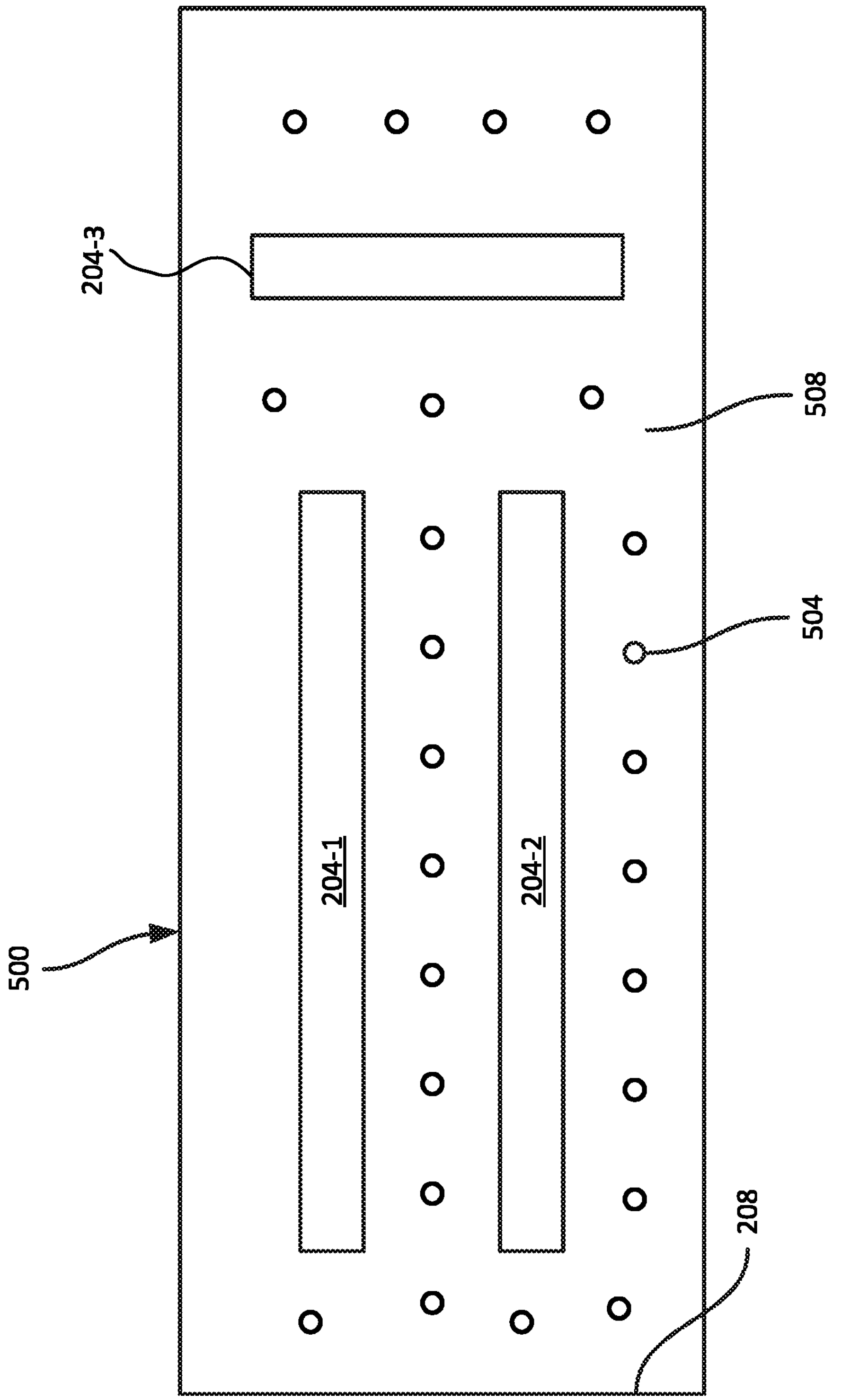
FIG. 5 is a diagram illustrating an intermediate map obtained via the performance of blocks 315-327 of the method of FIG. 3.

Turning briefly to FIG. 5, an intermediate map 500 is illustrated, resulting from the performance of block 320 for each candidate 400 shown in FIG. 4. The intermediate map 500 includes the obstacles of the map 200 (e.g., the shelf modules 204 and the walls 208), as well as virtual obstacles 504 corresponding to the candidates 400 evaluated as being viable at block 320. The intermediate map 500 also contains remaining unoccupied space 508, which is the portion of the unoccupied space 210 that is distinct from the virtual obstacles 504.

Returning to FIG. 3, at block 335 the apparatus 100 is configured to generate a set of updated cells, by partitioning the remaining unoccupied space 508 in the intermediate map 500. Partitioning of the remaining unoccupied space 508 can be performed as described above in connection with block 310. For example, the apparatus 100 can sample a plurality of points in the intermediate map 500 and label each sampled point with an identifier of the nearest obstacle, and fit cell boundaries to the labelled points. As will be evident, the inclusion of the virtual obstacles 504 in the intermediate map 500 leads to additional partitions in the remaining unoccupied space 508.

Figure 6:
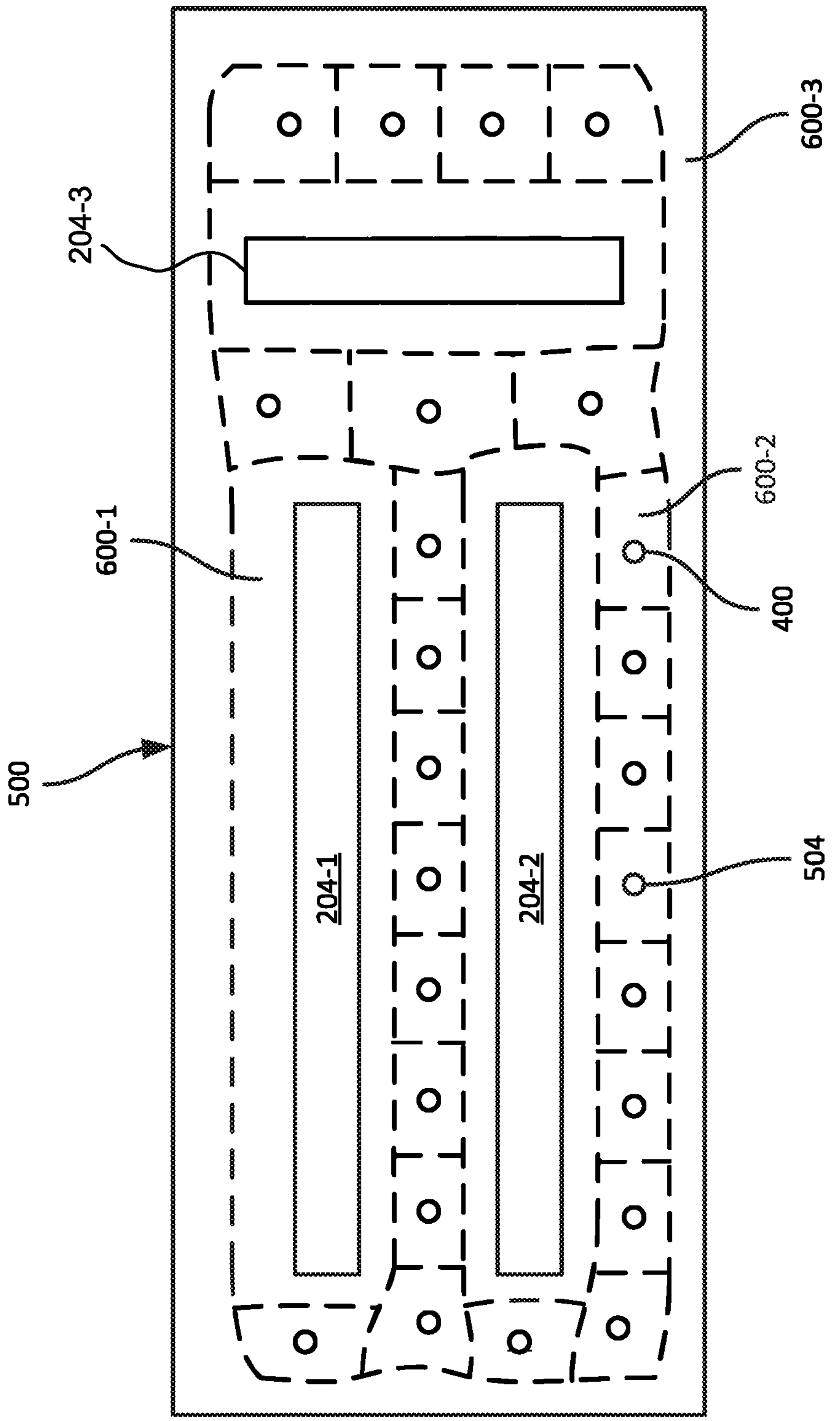
FIG. 6 is a diagram illustrating the output of an example performance of block 335 of the method of FIG. 2.

Turning to FIG. 6, an example set of updated cells 600 is illustrated, superimposed on the intermediate map 500. The updated cells 600 partition the remaining unoccupied space 508 with greater granularity than the cells 212. Three examples of the cells 600 are labelled in FIG. 6, including a cell 600-1 containing unoccupied space proximal to the shelf module 204-1, a cell 600-2 containing unoccupied space proximal to one of the virtual obstacles 504, and a cell 600-3 containing unoccupied space proximal to the walls 208. As will be evident from FIG. 6, the boundaries of the cells 600 define a greater number of segments, covering a larger portion of the unoccupied space 210, than the boundaries of the cells 212 shown in FIG. 2.

Returning to FIG. 3, in response to generating the updated cells 600, at block 340 the apparatus 100 can be configured to determine whether to perform another iteration of blocks 315 to 335. As will be evident, another performance of blocks 315 to 335, using the boundaries of the cells 600 as inputs instead of the cells 212, may lead to more granular partitioning of the unoccupied space 210 relative to the cells 600.

In some examples, the apparatus 100 can be configured to perform a predetermined number of iterations of blocks 315 to 335, to place an upper limit on the degree of complexity introduced into the path planning process and reduce a computational load associated with increased granularity for navigational path generation. In those examples, the determination at block 340 can therefore be a determination of whether the predetermined number of iterations has been performed. In other examples, the apparatus 100 can omit the determination at block 340. In those examples, the apparatus 100 can perform a single instance of blocks 315 to 335, or continue iterating the performance of blocks 315 to 335 until no viable candidates are identified at block 320.

Figure 7:
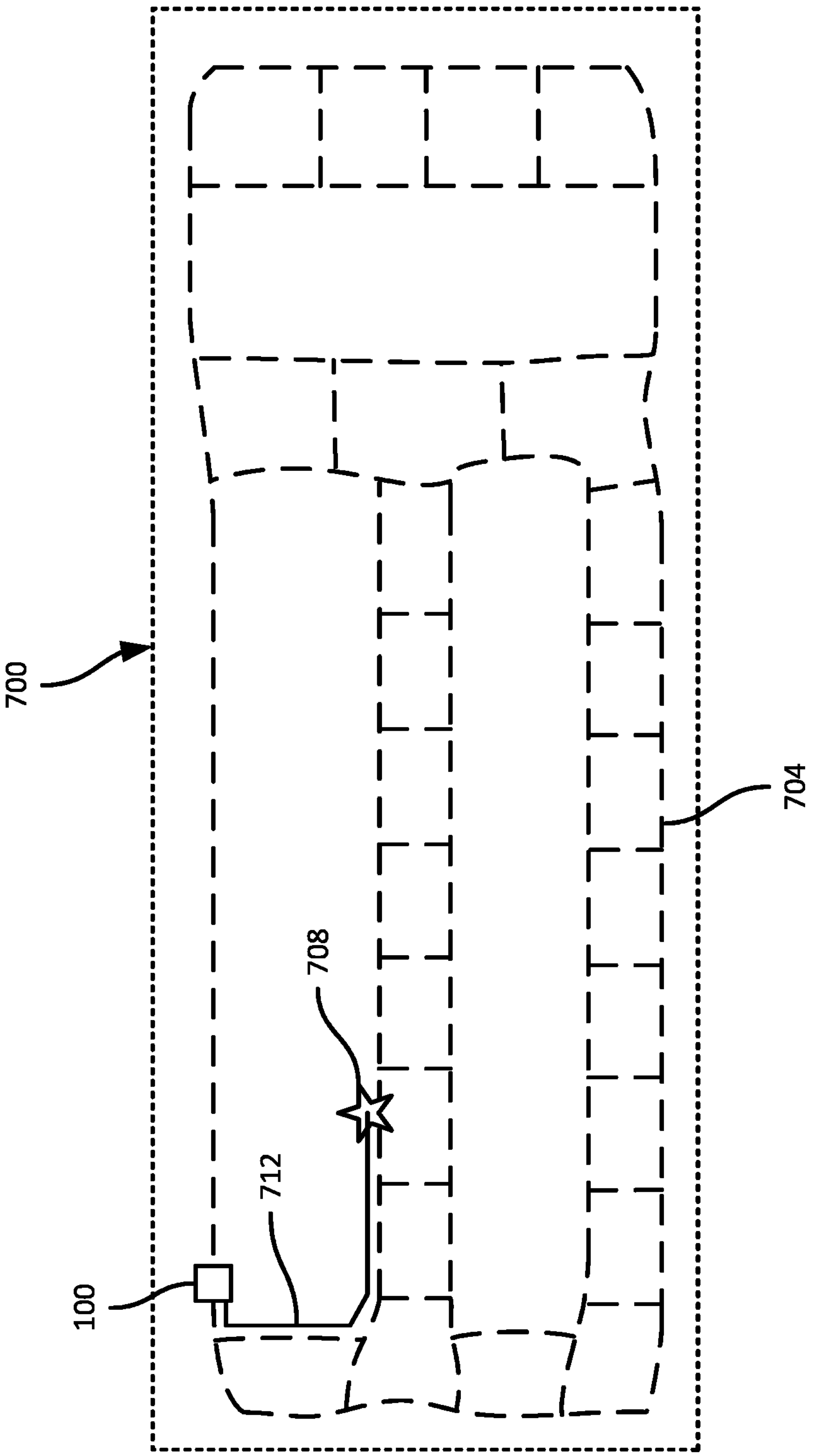
FIG. 7 is a diagram illustrating a set of updated cells used for path generation following block 345 of the method of FIG. 3.

Following a negative determination at block 340, the apparatus 100 proceeds to block 345. At block 345, the updated cells from the final performance of block 335 (e.g., when multiple iterations of blocks 315 to 335 are performed) are provided to a path planning mechanism, such as a component of the application 136, or a distinct application executed by the processor 124. FIG. 7 illustrates an example set 700 of updated cells provided to the path planning mechanism at block 345. The set 700 includes, for example, a plurality of segments 704 defined by the boundaries of the cells 600, and can omit the content of the map 200, thus reducing the computational load associated with path generation.

The apparatus 100, e.g., via execution of a path planning mechanism, can obtain an origin location such as the current location of the apparatus 100, and a target location 708. The apparatus 100 can then generate a path 712 between the origin location and target location 708 by selecting a combination of the segments 704.

As will be evident from the discussion above, the recursive generation of cells partitioning the unoccupied space 210 of the map 200 may enable the apparatus 100 to generate a greater variety of navigational paths throughout the facility than through use of the initial cells 212, without the computational cost of an occupancy grid.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method, comprising:

obtaining a map of a facility, the map containing at least one obstacle and unoccupied space;

partitioning the unoccupied space into a set of initial cells, each initial cell having an initial boundary containing a portion of the unoccupied space according to proximity between the portion of the unoccupied space and the at least one obstacle;

generating an intermediate map containing (i) the at least one obstacle, (ii) a set of virtual obstacles on the initial boundaries, and (iii) remaining unoccupied space;

partitioning the remaining unoccupied space into a set of updated cells, each updated cell having an updated boundary containing a portion of the remaining unoccupied space according to a proximity between the portion of the remaining unoccupied space, the at least one obstacle, and the virtual obstacles; and providing the set of updated cells to a navigational controller for generation of a navigational path for a mobile apparatus, the navigational path formed by segments of the updated boundaries, wherein generating the intermediate map includes:

generating candidate virtual obstacles on the initial boundaries; and retaining a subset of the candidate virtual obstacles as the virtual obstacles by determining whether each candidate virtual obstacle is surrounded by unoccupied space having a predetermined threshold radius.

2. The method of claim 1, further comprising:

obtaining, at the navigational controller, an origin location and a target location in the facility;

generating a path between the origin location and the target location based on the updated cells, the path comprising segments of the updated boundaries; and controlling the mobile apparatus to navigate along the path.

3. The method of claim 1, wherein the initial cells and the updated cells are Voronoi cells.

4. The method of claim 1, wherein the virtual obstacles are single-point obstacles.

5. The method of claim 1, further comprising generating the candidate virtual obstacles with a predetermined separation distance.

6. The method of claim 1, wherein the threshold radius is based on a dimension of the mobile apparatus.

7. The method of claim 1, further comprising, prior to providing the set of updated cells:

generating a further intermediate map containing (i) the at least one obstacle, (ii) a further set of virtual obstacles on the updated boundaries, and (iii) further remaining unoccupied space; and partitioning the further remaining unoccupied space into a set of further updated cells.

8. A computing device, comprising:

a memory; and a processor communicatively coupled with the memory, the processor configured to:

obtain a map of a facility, the map containing at least one obstacle and unoccupied space;

partition the unoccupied space into a set of initial cells, each initial cell having an initial boundary containing a portion of the unoccupied space according to proximity between the portion of the unoccupied space and the at least one obstacle;

generate an intermediate map containing (i) the at least one obstacle, (ii) a set of virtual obstacles on the initial boundaries, and (iii) remaining unoccupied space;

partition the remaining unoccupied space into a set of updated cells, each updated cell having an updated boundary containing a portion of the remaining unoccupied space according to proximity between the portion of the remaining unoccupied space, the at least one obstacle, and the virtual obstacles; and provide the set of updated cells to a navigational controller for generation of a navigational path for a mobile apparatus, the navigational path formed by segments of the updated boundaries, wherein the processor is configured to generate the intermediate map by:

generating candidate virtual obstacles on the initial boundaries; and retaining a subset of the candidate virtual obstacles as the virtual obstacles by determining whether each candidate virtual obstacle is surrounded by unoccupied space having a predetermined threshold radius.

9. The computing device of claim 8, wherein the processor is further configured to:

obtain, at the navigational controller, an origin location and a target location in the facility;

generate a path between the origin location and the target location based on the updated cells, the path comprising segments of the updated boundaries; and control the mobile apparatus to navigate along the path.

10. The computing device of claim 8, wherein the initial cells and the updated cells are Voronoi cells.

11. The computing device of claim 8, wherein the virtual obstacles are single-point obstacles.

12. The computing device of claim 8, wherein the processor is further configured to generate the candidate virtual obstacles with a predetermined separation distance.

13. The computing device of claim 8, wherein the threshold radius is based on a dimension of the mobile apparatus.

14. The computing device of claim 8, wherein the processor is further configured, prior to providing the set of updated cells, to:

generate a further intermediate map containing (i) the at least one obstacle, (ii) a further set of virtual obstacles on the updated boundaries, and (iii) further remaining unoccupied space; and partition the further remaining unoccupied space into a set of further updated cells.

15. A non-transitory computer-readable medium storing computer-readable instructions executable by a processor to:

obtain a map of a facility, the map containing at least one obstacle and unoccupied space;

partition the unoccupied space into a set of initial cells, each initial cell having an initial boundary containing a portion of the unoccupied space according to proximity between the portion of the unoccupied space and the at least one obstacle;

generate an intermediate map containing (i) the at least one obstacle, (ii) a set of virtual obstacles on the initial boundaries, and (iii) remaining unoccupied space;

partition the remaining unoccupied space into a set of updated cells, each updated cell having an updated boundary containing a portion of the remaining unoccupied space according to proximity between the portion of the remaining unoccupied space, the at least one obstacle, and the virtual obstacles; and provide the set of updated cells to a navigational controller for generation of a navigational path for a mobile apparatus, the navigational path formed by segments of the updated boundaries, wherein the instructions, when executed, cause the processor to generate the intermediate map by:

generating candidate virtual obstacles on the initial boundaries; and retaining a subset of the candidate virtual obstacles as the virtual obstacles by determining whether each candidate virtual obstacle is surrounded by unoccupied space having a predetermined threshold radius.

* * * * *